United States Patent
Maekawa (10) Patent No.: US 12,522,088 B2
(45) Date of Patent: Jan. 13, 2026

(54) POWER SUPPLY DEVICE AND POWER SUPPLY SYSTEM

(71) Applicant: IHI Corporation, Tokyo (JP)

(72) Inventor: Michisato Maekawa, Tokyo (JP)

(73) Assignee: IHI Corporation, Tokyo (JP)

( * ) Notice: Subject to any disclaimer, the term of this patent is extended or adjusted under 35 U.S.C. 154(b) by 806 days.

(21) Appl. No.: 17/784,919

(22) PCT Filed: Nov. 25, 2020

(86) PCT No.: PCT/JP2020/043879
§ 371 (c)(1),
(2) Date: Jun. 13, 2022

(87) PCT Pub. No.: WO2021/161616
PCT Pub. Date: Aug. 19, 2021

(65) Prior Publication Data
US 2023/0347759 A1    Nov. 2, 2023

(30) Foreign Application Priority Data
Feb. 13, 2020   (JP) .................................. 2020-022432

(51) Int. Cl.
*H02J 7/00*       (2006.01)
*B60L 53/122*   (2019.01)
(Continued)

(52) U.S. Cl.
CPC ........... *B60L 53/126* (2019.02); *B60L 53/122* (2019.02); *H02J 50/402* (2020.01); *H02J 50/90* (2016.02)

(58) Field of Classification Search
None
See application file for complete search history.

(56) References Cited

U.S. PATENT DOCUMENTS

2010/0017249 A1* 1/2010 Fincham ............... G06Q 50/06
                                                                        320/108
2013/0038272 A1   2/2013 Sagata
(Continued)

FOREIGN PATENT DOCUMENTS

JP    2012-244635 A    12/2012
JP    2013-258800 A    12/2013
(Continued)

*Primary Examiner* — Arun C Williams
(74) *Attorney, Agent, or Firm* — Volpe Koenig (57) ABSTRACT

A power supply device includes a first coil part and a second coil part, a power transmission request part configured to transmit a power transmission request to the movable object, a power reception information acquisition part configured to acquire first power reception information of the first coil part and second power reception information of the second coil part, a movable object position determination part configured to determine whether the movable object is positioned at a first power supply position or a second power supply position, and a power transmission control part configured to cause the first coil part to transmit power when it is determined that the movable object is positioned at the first power supply position, and to cause the second coil part to transmit power when it is determined that the movable object is positioned at the second power supply position.

6 Claims, 6 Drawing Sheets

(51) Int. Cl.
*B60L 53/126* (2019.01)
*H02J 50/40* (2016.01)
*H02J 50/90* (2016.01)

(56) References Cited

U.S. PATENT DOCUMENTS

| | | |
|---|---|---|
| 2014/0074332 A1 | 3/2014 | Ichikawa et al. |
| 2014/0257614 A1 | 9/2014 | Niizuma |
| 2015/0084587 A1 | 3/2015 | Kato et al. |
| 2015/0115704 A1 | 4/2015 | Gorai et al. |
| 2015/0165923 A1 | 6/2015 | Hirayama et al. |
| 2016/0280077 A1 | 9/2016 | Tsukamoto |
| 2016/0297314 A1 | 10/2016 | Iwai et al. |
| 2019/0225105 A1 | 7/2019 | Niizuma |

FOREIGN PATENT DOCUMENTS

| | | |
|---|---|---|
| JP | 2014-017747 A | 1/2014 |
| JP | 2014-054095 A | 3/2014 |
| JP | 2015-133768 A | 7/2015 |
| JP | 2016-101875 A | 6/2016 |
| JP | 2016-213992 A | 12/2016 |
| JP | 2018-143051 A | 9/2018 |
| JP | 2019-126253 A | 7/2019 |
| WO | 2012/086048 A1 | 6/2012 |
| WO | 2013/141295 A1 | 9/2013 |
| WO | 2013/168281 A1 | 11/2013 |
| WO | 2014/157091 A1 | 10/2014 |

\* cited by examiner

POWER SUPPLY DEVICE AND POWER SUPPLY SYSTEM

TECHNICAL FIELD

The present disclosure relates to a power supply device that wirelessly transmits and receives electric power to and from a movable object, and a power supply system.

BACKGROUND ART

For example, Patent Literature 1 discloses a coil part being installed in each of a plurality of parking spaces, and power being wirelessly transmitted from the coil part of the parking space in which a vehicle is stopped to a power supply device mounted in the vehicle. When a plurality of the coil parts is installed, the coil part of the parking space in which the vehicle is stopped needs to be identified to transmit power. The device disclosed in Patent Literature 1 thus first transmits power from the plurality of the coil parts at different power levels. The device then determines which coil part the vehicle received the supplied power from (in which parking space the vehicle is stopped) based on the power level received by the vehicle and the power levels transmitted from the coil parts.

CITATION LIST

Patent Literature

Patent Literature 1: WO 2013/141295

SUMMARY OF INVENTION

Technical Problem

The device described above transmits power from the plurality of the coil parts to identify the parking space in which the vehicle is stopped. In this case, the coil parts of the parking spaces other than the parking space in which the vehicle is stopped transmit power even though no vehicles are stopped, resulting in a waste of power.

The present disclosure describes a power supply device and a power supply system that are capable of supplying electric power by determining a coil part for supplying power to a movable object while suppressing the waste of power in a case in which a plurality of the coil parts for supplying power to the movable object is installed.

Solution to Problem

A power supply device according to one embodiment of the present disclosure includes a first coil part and a second coil part capable of wirelessly transmitting and receiving power to and from a movable object, a power transmission request part configured to transmit a power transmission request to the movable object, a power reception information acquisition part configured to acquire first power reception information indicating a power reception state of the first coil part and second power reception information indicating a power reception state of the second coil part after the power transmission request is transmitted, a movable object position determination part configured to determine whether the movable object is positioned at a first power supply position for transmitting and receiving power to and from the first coil part, and to determine whether the movable object is positioned at a second power supply position for transmitting and receiving power to and from the second coil part based on the first power reception information and the second power reception information acquired, and a power transmission control part configured to cause the first coil part to transmit power when the movable object position determination part determines that the movable object is positioned at the first power supply position, and to cause the second coil part to transmit power when the movable object position determination part determines that the movable object is positioned at the second power supply position.

Effects of Invention

Various embodiments of the present disclosure make it possible to supply electric power by determining a coil part for supplying power to the movable object while suppressing the waste of power in a case in which a plurality of the coil parts for supplying power to the movable object is installed.

DESCRIPTION OF EMBODIMENTS

A power supply device according to one embodiment of the present disclosure includes a first coil part and a second coil part capable of wirelessly transmitting and receiving power to and from a movable object, a power transmission request part configured to transmit a power transmission request to the movable object, a power reception information acquisition part configured to acquire first power reception information indicating a power reception state of the first coil part and second power reception information indicating a power reception state of the second coil part after the power transmission request is transmitted, a movable object position determination part configured to determine whether the movable object is positioned at a first power supply position for transmitting and receiving power to and from the first coil part, and to determine whether the movable object is positioned at a second power supply position for transmitting and receiving power to and from the second coil part based on the first power reception information and the second power reception information acquired, and a power transmission control part configured to cause the first coil part to transmit power when the movable object position determination part determines that the movable object is positioned at the first power supply position, and to cause the second coil part to transmit power when the movable object position determination part determines that the movable object is positioned at the second power supply position.

In this power supply device, it is determined whether the movable object is positioned at the first power supply position and whether the movable object is positioned at the second power supply position based on the first power reception information of the first coil part and the second power reception information of the second coil part acquired after the power transmission request is transmitted to the movable object. That is, the power transmitted from the movable object to determine the position of the movable object is received by the first coil part or the second coil part, and can be used. The power supply device supply is thus capable of supplying power by determining a coil part for supplying power to the movable object while suppressing the waste of power in a case in which a plurality of the coil parts for supplying power to the movable object is installed.

The power supply device may further include a request reception part configured to receive a charge initiation request including identification information of the movable object from the movable object, wherein the power transmission request part may transmit the power transmission request to the movable object identified by the identification information included in the charge initiation request when the request reception part receives the charge initiation request.

In this case, the power supply device is capable of initiating the transmission of the power transmission request and the determination of the power supply position at which the movable object is positioned at appropriate timings. The power supply device is also capable of appropriately transmitting the power transmission request to the movable object that has made the charge initiation request by transmitting the power transmission request to the movable object identified by the identification information included in the charge initiation request.

In the power supply device, the power transmission request part may transmit the power transmission request to the movable object to transmit power in a predetermined power transmission pattern when the movable object position determination part determines that power is received by both the first coil part and the second coil part based on the first power reception information and the second power reception information, and the movable object position determination part may determine at which of the first power supply position and the second power supply position the movable object is positioned based on the first power reception information and the second power reception information acquired after the power transmission request for the predetermined power transmission pattern is transmitted and the predetermined power transmission pattern.

In the power supply device, when power is received by both the first coil part and the second coil part after the power transmission request is transmitted, the power transmission request is transmitted again to the movable object to transmit power in a predetermined power transmission pattern. By the movable object transmitting power again in the predetermined power transmission pattern, the power corresponding to the predetermined power transmission pattern is received by the first coil part or the second coil part. The power supply device is thus capable of determining at which of the first power supply position and the second power supply position the movable object to which the power transmission request has been made is positioned based on the first power reception information and the second power reception information acquired after the power transmission request is transmitted again and the predetermined power transmission pattern.

In the power supply device, the movable object may include a first movable object and a second movable object, the power transmission request part may transmit the power transmission request to the first movable object to transmit power in a predetermined first power transmission pattern, and transmit the power transmission request to the second movable object to transmit power in a predetermined second power transmission pattern different from the first power transmission pattern when the request reception part receives the charge initiation request from the first movable object and the second movable object, and the movable object position determination part may determine at which of the first power supply position and the second power supply position the first movable object is positioned, and determine at which of the first power supply position and the second power supply position the second movable object is positioned based on the first power reception information and the second power reception information acquired, and the first power transmission pattern and the second power transmission pattern.

For example, when initiating power supply to the first movable object and the second movable object at the same time using the first coil part and the second coil part, this power supply device is capable of determining at which of the first power supply position and the second power supply position the first movable object and the second movable object are positioned based on the first power reception information and the second power reception information acquired, and the first power transmission pattern and the second power transmission pattern.

The power supply device may further include a notification part configured to provide notification when the movable object position determination part determines that neither the first coil part nor the second coil part has received power based on the first power reception information and the second power reception information.

In this case, the power supply device is capable of providing notification of a failure such as that the stop position of the movable object is misaligned from the first power supply position and the second power supply position.

A power supply system according to another embodiment of the present disclosure includes the power supply device above, and a movable object-side power supply device mounted in the movable object and capable of wirelessly transmitting and receiving power to and from the first coil part and the second coil part, wherein the movable object-side power supply device is configured to transmit power according to a power transmission request transmitted by the power transmission request part.

In this power supply system, it is determined whether the movable object is positioned at the first power supply position and whether the movable object is positioned at the second power supply position based on the first power reception information of the first coil part and the second power reception information of the second coil part acquired after the power transmission request is transmitted to the movable object. That is, the power transmitted from the movable object to determine the position of the movable object is received by the first coil part or the second coil part, and can be used. The power supply system is thus capable of supplying power by determining the coil part for supplying power to the movable object while suppressing the waste of power in the case in which a plurality of the coil parts for supplying power to the movable object is installed.

Embodiments of the power supply system using the power supply device of the present disclosure will be described below with reference to the drawings. It should be noted that like or corresponding elements are given like reference signs in the description below, and redundant explanation is omitted.

Figure 1:
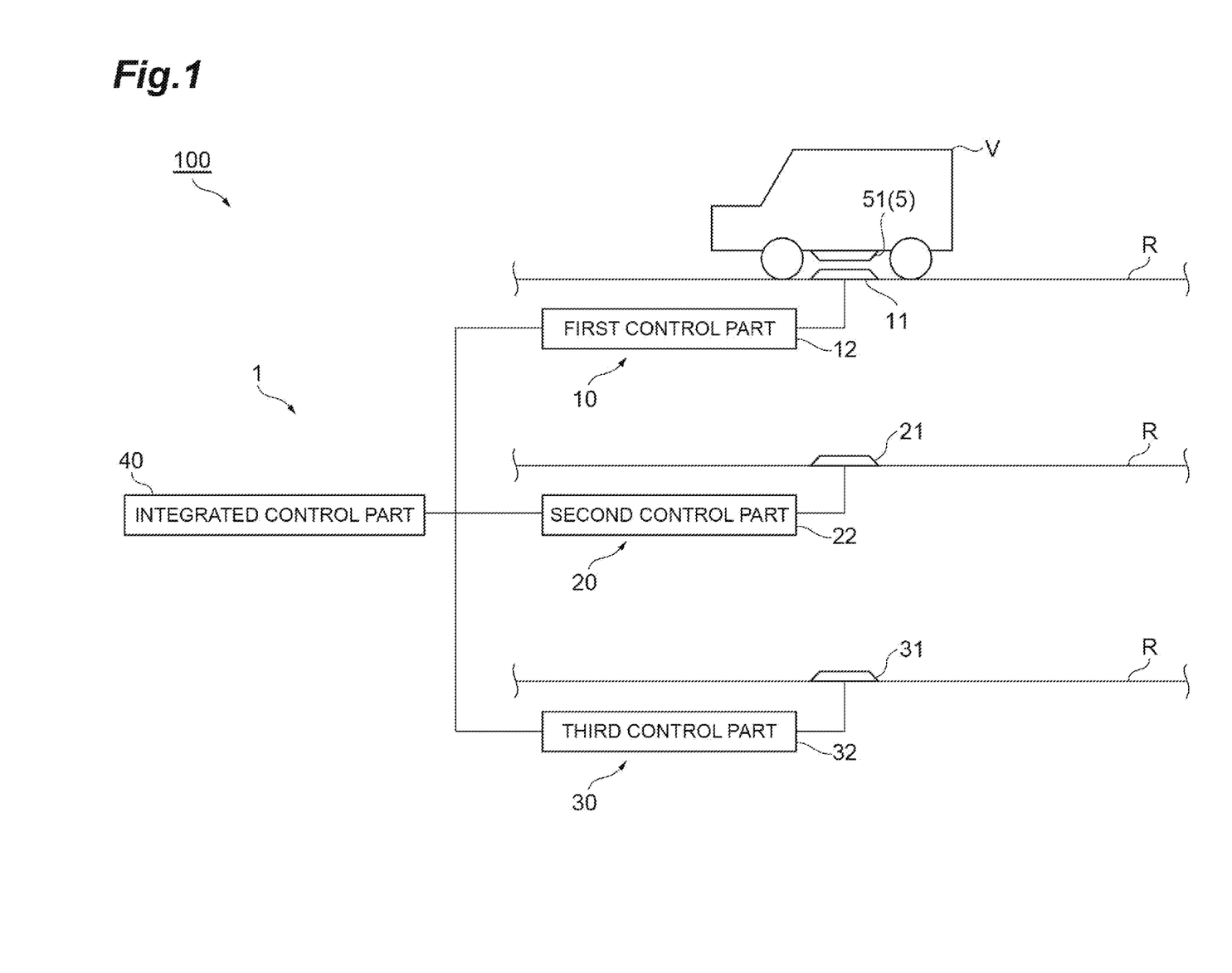
FIG. 1 is a diagram illustrating a schematic configuration of a power supply system according to an embodiment.

As illustrated in FIG. 1, a power supply system 100 includes a ground-side power supply device (power supply device) 1 and a vehicle-side power supply device (movable object-side power supply device) 5 mounted in a vehicle (movable object) V. The ground-side power supply device 1 is a system for wirelessly transmitting and receiving electric power between the ground-side power supply device 1 and the vehicle-side power supply device 5. The ground-side power supply device 1 is installed in a power supply area in a parking lot and the like. The vehicle-side power supply device 5 is mounted in the vehicle V which is, for example, an electric vehicle. The power supply system 100 supplies power to the vehicle V that has arrived at the power supply area using magnetic coupling between coils by magnetic resonance, electromagnetic induction, or the like. It should be noted that the wireless power supply method is not limited to those using magnetic coupling, and may, for example, use electric field resonance.

Figure 2:
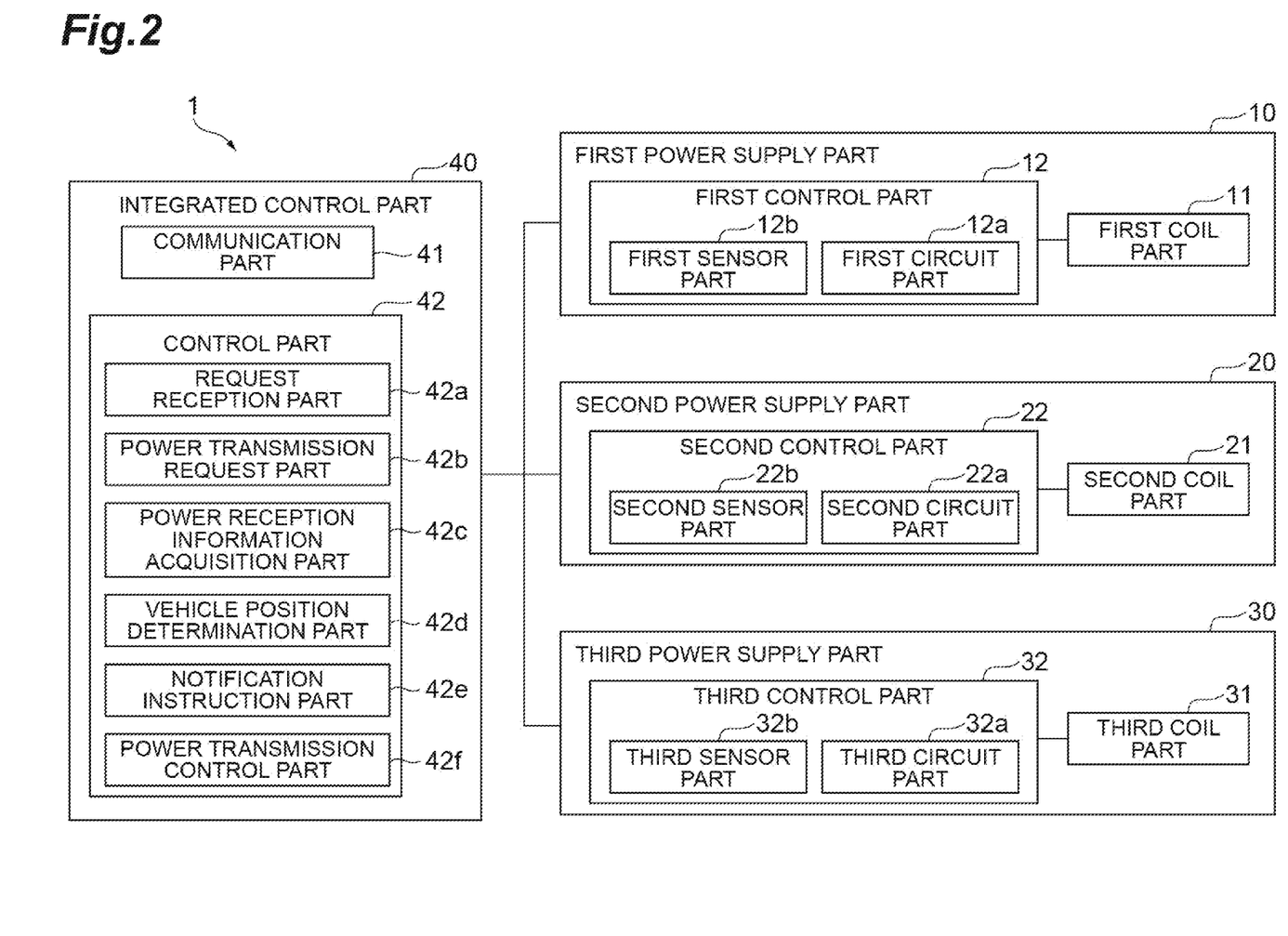
FIG. 2 is a diagram illustrating a schematic configuration of a ground-side power supply device.

As illustrated in FIGS. 1 and 2, the ground-side power supply device 1 includes a first power supply part 10, a second power supply part 20, a third power supply part 30, and an integrated control part 40. The first power supply part 10 to the third power supply part 30 are each capable of supplying power to the vehicle V. In the present embodiment, the first power supply part 10 to the third power supply part 30 are each capable of wirelessly receiving power transmitted from the vehicle V More specifically, the first power supply part 10 includes a first coil part 11 and a first control part 12. The first coil part 11 is installed on a road surface R of a parking lot and the like. The first coil part 11, for example, may be provided so as to protrude above the road surface R, may be provided with a lower part thereof being embedded, or may be completely embedded. The first coil part 11 is capable of wirelessly transmitting and receiving power to and from the vehicle-side power supply device 5 (vehicle-side coil part 51) mounted in the vehicle V.

When supplying power to the vehicle-side power supply device 5, the first coil part 11 generates a magnetic flux by AC power sent from the first control part 12. When receiving power from the vehicle-side power supply device 5, the first coil part 11 generates an induced current by the magnetic flux generated by the vehicle-side power supply device 5 (vehicle-side coil part 51) being interlinked.

The first control part 12 includes a first circuit part 12a and a first sensor part 12b. The first circuit part 12a generates high frequency AC power suitable for wireless power supply from power supplied from a power source or the like not shown. The first circuit part 12a sends AC power to the first coil part 11 based on an instruction from the integrated control part 40.

The first circuit part 12a also converts the received power into a predetermined power state such as converting the power into a predetermined frequency when the first coil part 11 receives the power transmitted from the vehicle-side power supply device 5 of the vehicle V. The first circuit part 12a includes various electric circuits such as a rectifier circuit and a DC-DC converter. The power received by the first coil part 11 and converted by the first circuit part 12a may, for example, be used as a power source in the ground-side power supply device 1, or charge a battery provided in the ground-side power supply device 1 or the like.

The first sensor part 12b detects a power reception state when the first coil part 11 receives the power transmitted from the vehicle-side power supply device 5. The first sensor part 12b detects, for example, a power value as the power reception state of the first coil part 11. It should be noted that the first sensor part 12b may detect, for example, a coil current as the power reception state of the first coil part 11.

The second power supply part 20 includes a second coil part 21 and a second control part 22. Since the second coil part 21 has a configuration similar to that of the first coil part 11, a detailed description of the second coil part 21 will be omitted. The second control part 22 includes a second circuit part 22a and a second sensor part 22b. Since the second circuit part 22a and the second sensor part 22b have configurations similar to those of the first circuit part 12a and the first sensor part 12b, respectively, detailed descriptions of the second circuit part 22a and the second sensor part 22b will be omitted.

The third power supply part 30 includes a third coil part 31 and a third control part 32. Since the third coil part 31 has a configuration similar to that of the first coil part 11, a detailed description of the third coil part 31 will be omitted. The third control part 32 includes a third circuit part 32a and a third sensor part 32b. Since the third circuit part 32a and the third sensor part 32b have configurations similar to those of the first circuit part 12a and the first sensor part 12b, respectively, detailed descriptions of the third circuit part 32a and the third sensor part 32b will be omitted.

The integrated control part 40 controls the transmission and reception of power of the first power supply part 10 to the third power supply part 30. The integrated control part 40, for example, may be provided integrated with any one of the first power supply part 10 to the third power supply part 30, or may be provided separate from the first power supply part 10 to the third power supply part 30. The integrated control part 40 includes a communication part 41 and a control part 42. The communication part 41 is a communication device for wireless communication with the vehicle V. The communication part 41 is capable of wireless communication with the vehicle V using a known wireless communication method. The communication part 41 may, for example, automatically transition to a communicable state when the distance between the communication part 41 and the vehicle V is within a predetermined communication initiation distance.

The control part 42 is composed, for example, of an electronic control unit including a central processing unit (CPU), a read only memory (ROM), a random access memory (RAM), and the like. The control part 42 is connected to the first power supply part 10 to the third power supply part 30, for example, by communication lines, and is communicable with the first power supply part 10 to the third power supply part 30. Functionally, the integrated control part 40 includes a request reception part 42a, a power transmission request part 42b, a power reception information acquisition part 42c, a vehicle position determination part (movable object position determination part) 42d, a notification instruction part 42e, and a power transmission control part 42f The request reception part 42a receives a charge initiation request including identification information of the vehicle V from the vehicle V via the communication part 41. The charge initiation request is a request that is transmitted from the vehicle V to the ground-side power supply device 1 to request initiation of power supply from the ground-side power supply device 1 (first power supply part 10 to third power supply part 30) to the vehicle-side power supply device 5. Details of the transmission of the charge initiation request will be described further below.

The power transmission request part 42b transmits a power transmission request to the vehicle-side power supply device 5 of the vehicle V via the communication part 41. Here, when the charge initiation request is received by the request reception part 42a, the power transmission request part 42b transmits the power transmission request to the vehicle V identified by the identification information included in the charge initiation request. The vehicle-side power supply device 5 mounted in the vehicle V accordingly transmits power based on the power transmission request. This transmission of power from the vehicle V is for determining from which of the first power supply part 10 to the third power supply part 30 power is to be transmitted to the vehicle V (vehicle-side power supply device 5). The power transmitted from the vehicle-side power supply device 5 is received by one of the first coil part 11 to the third coil part 31.

The power reception information acquisition part 42c acquires first power reception information which indicates the power reception state of the first coil part 11, second power reception information which indicates the power reception state of the second coil part 21, and third power reception information which indicates the power reception state of the third coil part 31 after the power transmission request is transmitted by the power transmission request part 42b. In the present embodiment, the power value detected by the first sensor part 12b is used as the first power reception information. Similarly, the power values detected by the second sensor part 22b and the third sensor part 32b are used as the second power reception information and the third power reception information, respectively.

The vehicle position determination part 42d determines whether the vehicle V is positioned at a first power supply position, whether the vehicle V is positioned at a second power supply position, and whether the vehicle V is positioned at a third power supply position based on the first power reception information to the third power reception information. The first power supply position is a stop position of the vehicle V for transmitting and receiving power between the first coil part 11 of the first power supply part 10 and the vehicle V. Specifically, the first power supply position is the stop position of the vehicle V in which the first coil part 11 and the vehicle-side coil part 51 of the vehicle-side power supply device 5 face one another in the vertical direction. Similarly, the second power supply position is the stop position of the vehicle V for transmitting and receiving power between the second coil part 21 of the second power supply part 20 and the vehicle V. The third power supply position is the stop position of the vehicle V for transmitting and receiving power between the third coil part 31 of the third power supply part 30 and the vehicle V.

Here, the power transmitted from the vehicle-side power supply device 5 of the vehicle V according to the power transmission request is received by one of the first coil part 11 to the third coil part 31. The vehicle position determination part 42d thus determines which of the first coil part 11 to the third coil part 31 has received the power transmitted from the vehicle-side power supply device 5 of the vehicle V based on the first power reception information to the third power reception information. When the power transmitted from the vehicle-side power supply device 5 is received by the first coil part 11, then the vehicle position determination part 42d can determine that the vehicle V is positioned at the first power supply position. When the power transmitted from the vehicle-side power supply device 5 is received by the second coil part 21, the vehicle position determination part 42d can determine that the vehicle V is positioned at the second power supply position. When the power transmitted from the vehicle-side power supply device 5 is received by the third coil part 31, the vehicle position determination part 42d can determine that the vehicle V is positioned at the third power supply position.

It should be noted that, in determining whether the first coil part 11, etc., has received power, the vehicle position determination part 42d may determine that the first coil part 11, etc., has received power when the received power value is more than or equal to a predetermined determination lower limit. The vehicle position determination part 42d may also determine a power supply position (first power supply position to third power supply position) corresponding to a coil part from among the first coil part 11 to the third coil part 31 that has received the maximum power value as the power supply position at which the vehicle V is positioned.

For example, in the example illustrated in FIG. 1, the vehicle V is stopped at the first power supply position. The power transmitted from the vehicle-side power supply device 5 based on the power transmission request is thus received by the first coil part 11. In this case, the vehicle position determination part 42d determines that the vehicle V is positioned at the first power supply position based on the first power reception information to the third power reception information.

Here, it may be contemplated that the vehicle position determination part 42d determines that power is received by two or more coil parts from among the first coil part 11 to the third coil part 31 even though the power transmission request has been made to one vehicle V. For example, it may be contemplated that power is determined to be received by two or more of the coil parts when the first coil part 11 to the third coil part 31 receive power other than the power transmitted from the vehicle-side power supply device 5 of the vehicle V, or when there is a failure in the first sensor part 12b to the third sensor part 32b.

When the vehicle position determination part 42d determines that power is received by two or more of the coil parts, the power transmission request part 42b transmits the power transmission request again to the vehicle V that has made the charge initiation request to transmit power in a predetermined power transmission pattern. This power transmission pattern may include at least one of transmitting power at a power level of a predetermined value, changing the power level to be transmitted, switching the power transmission on and off at predetermined intervals, and the like. For example, the power transmission pattern may be a pattern in which power is transmitted at 1 kW for five seconds, then at 2 kW for five seconds, and then at 1 kW for five seconds. When the power transmission request for transmitting power at the predetermined power transmission pattern is received, the vehicle-side power supply device 5 of the vehicle V transmits power according to the predetermined power transmission pattern.

The vehicle position determination part 42d is capable of determining at which of the first power supply position to the third power supply position the vehicle V is positioned based on the first power reception information to the third power reception information acquired after the power transmission request for the predetermined power transmission pattern is transmitted, and the predetermined power transmission pattern. Here, the vehicle position determination part 42d is capable of determining one of the first coil part 11 to the third coil part 31 that has received the power corresponding to the power transmitted in the predetermined power transmission pattern as the coil part that has received the power transmitted from the vehicle-side power supply device 5 by taking into consideration power transmission efficiency or the like. The vehicle position determination part 42d can then determine at which of the first power supply position to the third power supply position the vehicle V is positioned based on the coil part (first coil part 11 to third coil part 31) that has been determined to have received the power transmitted from the vehicle-side power supply device 5.

Figure 3:
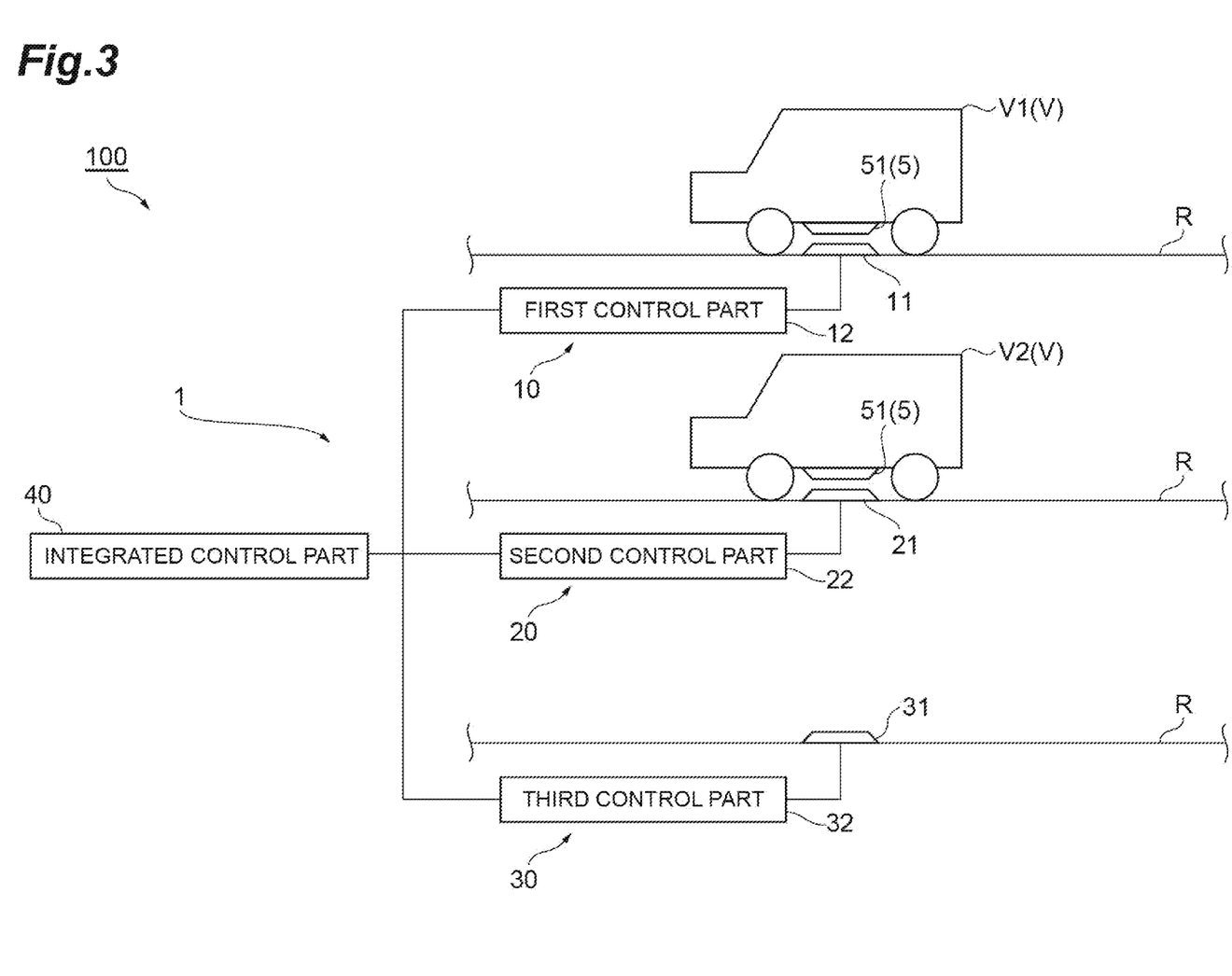
FIG. 3 is a schematic view illustrating a plurality of vehicles positioned in a power supply area in which a plurality of the ground-side power supply devices is installed.

As illustrated in FIG. 3, two vehicles V may enter the power supply area in which the ground-side power supply device 1 is installed. Hereinafter, for convenience of description, one of the two vehicles V is referred to as a first vehicle (first movable object) V1, and the other as a second vehicle (second movable object) V2. It is assumed that the first vehicle V1 is positioned at the first power supply position, and the second vehicle V2 is positioned at the second power supply position. It is also assumed that the first vehicle V1 has made the charge initiation request to the ground-side power supply device 1, and that the power transmission request part 42b of the integrated control part 40 has made the power transmission request to the vehicle-side power supply device 5 of the first vehicle V1. It is further assumed that the vehicle-side power supply device 5 of the second vehicle V2 is transmitting power to the second coil part 21 even though the second vehicle V2 has not made the charge initiation request to the ground-side power supply device 1.

Similarly to the case described above, the vehicle position determination part 42d also determines in this case that power is received by two or more of the coil parts from among the first coil part 11 and the second coil part 21 even though the power transmission request has been made only to the first vehicle V1. When the vehicle position determination part 42d determines that power is received by the first coil part 11 and the second coil part 21, the power transmission request part 42b transmits the power transmission request again to the first vehicle V1 that has made the charge initiation request to transmit power in the predetermined power transmission pattern. The vehicle-side power supply device 5 of the first vehicle V1 accordingly transmits power according to the predetermined power transmission pattern. The vehicle position determination part 42d can then determine at which of the first power supply position to the third power supply position the first vehicle V1 is positioned based on the first power reception information to the third power reception information acquired after the power transmission request for the predetermined power transmission pattern is transmitted, and the predetermined power transmission pattern.

Additionally, as illustrated in FIG. 3, a plurality of the charge initiation requests may be made by the first vehicle V1 and the second vehicle V2 at the same time with the first vehicle V1 positioned at the first power supply position and the second vehicle V2 positioned at the second power supply position. In this case, the ground-side power supply device 1 is required to determine at which of the first power supply position to the third power supply position the first vehicle V1 and the second vehicle V2 are positioned such as to manage the state of power supply to the first vehicle V1 and the second vehicle V2.

When the request reception part 42a receives the charge initiation requests from the first vehicle V1 and the second vehicle V2, the power transmission request part 42b transmits the power transmission request to the first vehicle V1 to transmit power in a predetermined first power transmission pattern, and transmits the power transmission request to the second vehicle V2 to transmit power in a predetermined second power transmission pattern that is different from the first power transmission pattern. The first power transmission pattern and the second power transmission pattern may include at least one of transmitting power at a power level of a predetermined value, changing the power level to be transmitted, switching the power transmission on and off at predetermined intervals, and the like. For example, the request reception part 42a may transmit the power transmission request to the first vehicle V1 to transmit power at 1 kW as the first power transmission pattern, and transmit the power transmission request to the second vehicle V2 to transmit power at 2 kW as the second power transmission pattern. When the power transmission requests are transmitted to the first vehicle V1 and the second vehicle V2, the vehicle-side power supply device 5 of the first vehicle V1 transmits power according to the first power transmission pattern, and the vehicle-side power supply device 5 of the second vehicle V2 transmits power according to the second power transmission pattern.

The vehicle position determination part 42d is capable of determining at which of the first power supply position to the third power supply position the first vehicle V1 is positioned and determining at which of the first power supply position to the third power supply position the second vehicle V2 is positioned based on the first power reception information to the third power reception information acquired after the transmission requests for the first transmission pattern and the second transmission pattern are transmitted, and the first power transmission pattern and the second power transmission pattern. As described above, the vehicle position determination part 42d is also capable of determining in this case the first coil part 11 to the third coil part 31 that has received the power corresponding to the power transmitted in the first power transmission pattern and the second power transmission pattern by taking into consideration power transmission efficiency or the like.

It should be noted that when the charge initiation requests are made by the first vehicle V1 and the second vehicle V2 at the same time, the integrated control part 40 may first make the power transmission request to the first vehicle V1 to determine at which of the power supply positions the first vehicle V1 is positioned, and then make the power transmission request to the second vehicle V2 to determine at which of the power supply positions the second vehicle V2 is positioned.

In a case in which the vehicle position determination part 42d determines that none of the first coil part 11 to the third coil part 31 has received power based on the first power reception information to the third power reception information after the power transmission request part 42b has transmitted the power transmission request, the notification instruction part 42e provides a notification instruction to a notification device to provide notification. The case in which none of the first coil part 11 to the third coil part 31 has received power refers to a case in which the vehicle position determination part 42d is unable to determine at which of the first power supply position to the third power supply position the vehicle V is positioned. The notification from this notification device allows the driver of the vehicle V, for example, to realize that the stop position of the vehicle V is misaligned from the first power supply position to the third power supply position so that power cannot be supplied appropriately.

Figure 4:
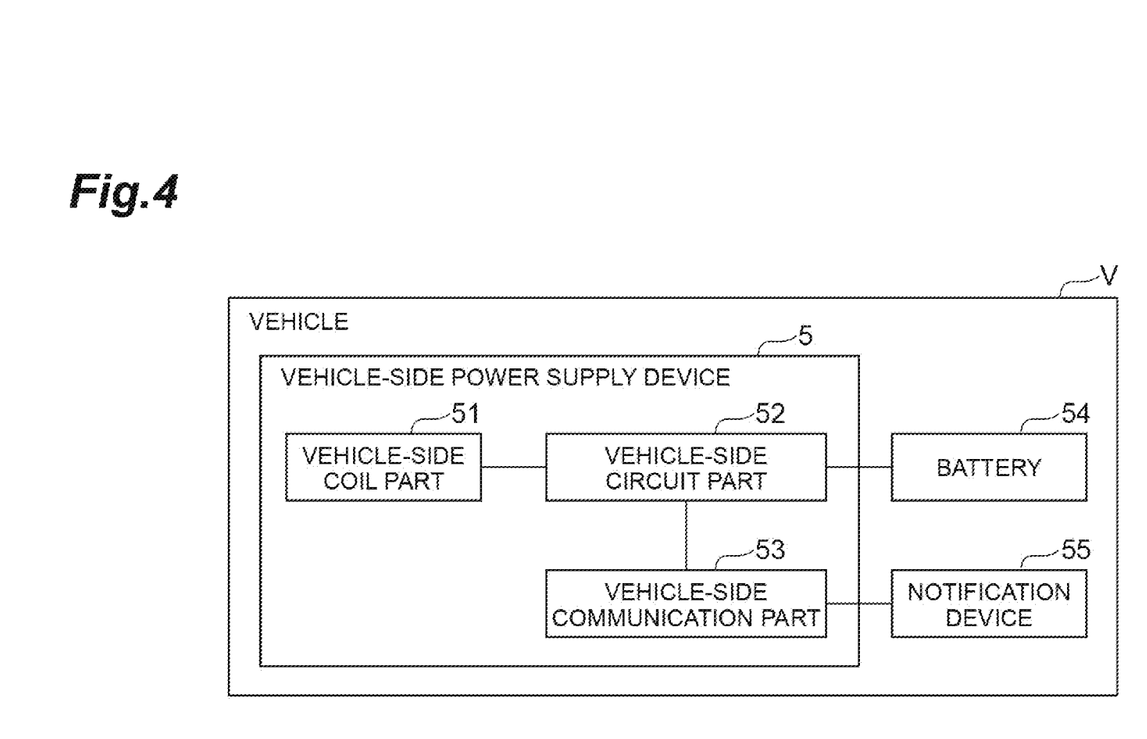
FIG. 4 is a diagram illustrating a schematic configuration of a movable object-side power supply device mounted in a vehicle.

The notification device to which the notification instruction part 42e provides the notification instruction is mounted in the vehicle V in this embodiment. A notification device 55 that is mounted in the vehicle V will be described in detail further below. In the case in which the notification device 55 is mounted in the vehicle V, the notification instruction part 42e is capable of transmitting the notification instruction to the vehicle V via the communication part 41. The power transmission control part 42f and the notification device 55 mounted in the vehicle V thus function as a notification part that provides notification when the vehicle position determination part 42d determines that none of the first coil part 11 to the third coil part 31 has received power based on the first power reception information to the third power reception information.

It should be noted that this notification device is not limited to being mounted in the vehicle V. For example, the notification device may be installed in the vicinity of the first power supply part 10 to the third power supply part 30 or the like to notify the driver of the vehicle V stopped at a position misaligned from the first power supply position to the third power supply position. The notification device may be a display device, a lamp, a loud speaker, or the like.

When it is determined by the vehicle position determination part 42d that the vehicle V is positioned at the first power supply position, the power transmission control part 42f instructs the first power supply part 10 to transmit power from the first coil part 11. Similarly, when it is determined that the vehicle V is positioned at the second power supply position, the power transmission control part 42f instructs the second power supply part 20 to transmit power from the second coil part 21. When it is determined that the vehicle V is positioned at the third power supply position, the power transmission control part 42f instructs the third power supply part 30 to transmit power from the third coil part 31.

It should be noted that, for example, the charge initiation requests may be transmitted from a plurality of the vehicles V, and the vehicle position determination part 42d determines that each of the plurality of the vehicles V is positioned at one of the first power supply position to the third power supply position. In this case, the power transmission control part 42f is capable of simultaneously causing the first coil part 11 to the third coil part 31 corresponding to the power supply positions at which the vehicles V are stopped to transmit power to the vehicles V for which the stop positions have been determined based on the charge initiation requests.

When a charge stop request from the vehicle V is received via the communication part 41, the power transmission control part 42f instructs a power supply part from among the first power supply part 10 to the third power supply part 30 that is transmitting power to the vehicle V that has transmitted the charge stop request to stop transmitting power. It should be noted that the charge initiation request includes the identification information of the vehicle V. This enables the vehicle position determination part 42d to identify at which of the first power supply position to the third power supply position the vehicles V are positioned. That is, the power transmission control part 42f is capable of identifying which of the first power supply part 10 to the third power supply part 30 is transmitting power to which of the vehicles V. Additionally, the charge stop request includes the identification information of the vehicle V. This enables the power transmission control part 42f to determine which of the first power supply part 10 to the third power supply part 30 should stop transmitting power when the charge stop request is received.

The power transmission control part 42f is also capable of switching the states of the first power supply part 10 to the third power supply part 30 to one of a power transmission mode, a power reception mode, and a standby mode. The power transmission mode is a state in which the first power supply part 10, etc., are capable of supplying power. The first power supply part 10, etc., can transmit power after being switched to the power transmission mode. The power reception mode is a state in which the first power supply part 10, etc., are capable of receiving power. The first power supply part 10, etc., can receive power after being switched to the power reception mode. The standby mode is a state in which the first power supply part 10, etc., neither transmit nor receive power. The power transmission control part 42f switches the states of the first power supply part 10, etc., to either the power transmission mode or the power reception mode to cause the first power supply part 10, etc., to transmit or receive power as described above.

As illustrated in FIGS. 1 and 4, the vehicle V enters the power supply area in which the ground-side power supply device 1 is installed, and stops at the power supply position from among the first power supply position to the third power supply position that is vacant. For example, the driver of the vehicle V selects one of the vacant power supply positions, moves the vehicle V to the selected power supply position visually, and stops the vehicle V.

The vehicle V has the vehicle-side power supply device 5, a battery 54, and the notification device 55 mounted therein. The vehicle-side power supply device 5 receives power supplied from the first power supply part 10 to the third power supply part 30 to charge the battery 54. The vehicle-side power supply device 5 also supplies the power stored in the battery 54 based on the power transmission request from the integrated control part 40 of the ground-side power supply device 1.

More specifically, the vehicle-side power supply device 5 includes the vehicle-side coil part 51, a vehicle-side circuit part 52, and a vehicle-side communication part 53. The vehicle-side coil part 51 is provided, for example, on a lower surface of the body of the vehicle V. The vehicle-side coil part 51 receives power from one of the first power supply part 10 to the third power supply part 30. When receiving power from the ground-side power supply device 1, the vehicle-side coil part 51 faces one of the first coil part 11 to the third coil part 31 spaced in the vertical direction. The vehicle-side coil part 51 generates an induced current by the magnetic flux generated by the first coil part 11, etc., being interlinked with the vehicle-side coil part 51. The vehicle-side coil part 51 thus wirelessly receives AC power from the first coil part 11, etc. When transmitting power to the ground-side power supply device 1 (first power supply part 10 to third power supply part 30), the vehicle-side coil part 51 generates a magnetic flux by the AC power sent from the vehicle-side circuit part 52.

When the vehicle-side coil part 51 receives the power transmitted from the first power supply part 10, etc., the vehicle-side circuit part 52 converts the received power into a power state suitable for charging and charges the battery 54. Additionally, when the power transmission request is received from the integrated control part 40 of the ground-side power supply device 1 via the vehicle-side communication part 53, the vehicle-side circuit part 52 generates high frequency AC power suitable for wireless power supply according to the power transmission request from the power of the battery 54. The vehicle-side communication part 53 then supplies the generated AC power to the vehicle-side coil part 51 to cause the vehicle-side coil part 51 to transmit power. It should be noted that when an instruction for the power transmission pattern, the first power transmission pattern, or the second power transmission pattern is included in the power transmission request, the vehicle-side circuit part 52 generates AC power for transmitting power according to these power transmission patterns and supplies the same to the vehicle-side coil part 51. The vehicle-side circuit part 52 includes various electric circuits such as a rectifier circuit and a DC-DC converter.

To stop charging during charging of the battery 54 when, for example, the battery 54 is fully charged, the vehicle-side circuit part 52 transmits the charge stop request to the integrated control part 40 via the vehicle-side communication part 53. This charge stop request includes the identification information of the vehicle V The vehicle-side communication part 53 is a communication device for wireless communication with the communication part 41 of the integrated control part 40. The vehicle-side communication part 53 is capable of wireless communication with the vehicle V using a known wireless communication method.

The power stored in the battery 54 is used, for example, by an electric motor that causes the vehicle V to travel. The notification device 55 is provided in the cabin of the vehicle V. The notification device 55 provides notification when the notification instruction transmitted from the integrated control part 40 via the vehicle-side communication part 53 is received. Here, the notification device 55 provides notification that the stop position of the vehicle V is misaligned from the first power supply position to the third power supply position so that power cannot be supplied appropriately. The notification device 55 may be a display device, a lamp, a loud speaker, or the like.

Details of the transmission of the charge initiation request transmitted from the vehicle V to the ground-side power supply device 1 will now be described. The charge initiation request may, for example, be transmitted from the vehicle-side power supply device 5 through the vehicle-side communication part 53 based on operation by the driver of the vehicle V. In this case, for example, the driver of the vehicle V may transmit the charge initiation request when the driver moves the vehicle V and determines that the vehicle V is stopped at one of the first power supply position to the third power supply position.

Additionally, the charge initiation request may, for example, be automatically transmitted from the vehicle-side power supply device 5. Specifically, the vehicle-side power supply device 5 determines whether the vehicle V is stopped at one of the first power supply position to the third power supply position. When the vehicle V is stopped at one of the first power supply position to the third power supply position, the vehicle-side power supply device 5 may transmit the charge initiation request. It should be noted that the vehicle-side power supply device 5 may, for example, determine whether the vehicle V is stopped at the first power supply position, etc., based on detection results from various sensors for detecting the stop position.

The charge initiation request can thus be transmitted to the ground-side power supply device 1 by various methods. In the present embodiment, the method for transmitting the charge initiation request is not limited. It is only required that the charge initiation request is transmitted to the ground-side power supply device 1 when the vehicle-side power supply device 5 requests the initiation of power supply from the first power supply part 10, etc.

Described next is the flow of a process for initiating power supply by determining at which of the first power supply position to the third power supply position the vehicle V is positioned when the ground-side power supply device 1 initiates the supply of power to the vehicle-side power supply device 5. It should be noted that the flow chart illustrated in FIG. 5 starts when the ground-side power supply device 1 receives the charge initiation request from the vehicle V. That is, the state in which the flow chart illustrated in FIG. 5 starts is a state in which the alignment of the vehicle V to one of the first power supply position to the third power supply position is completed (it is determined by the driver or the like that the alignment is completed), and the charge initiation request is transmitted from the vehicle V.

Figure 5:
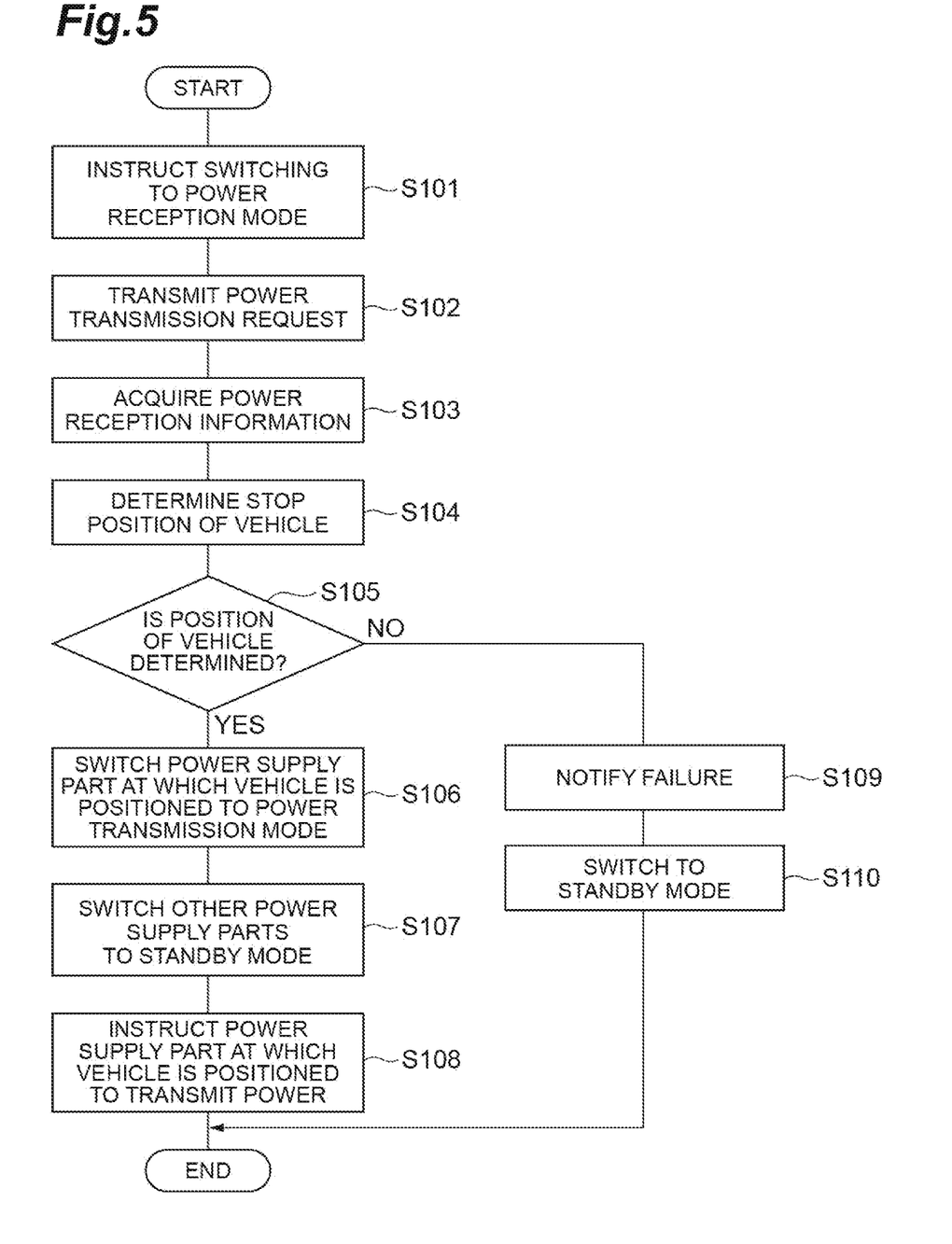
FIG. 5 is a flow chart illustrating the flow of a process of initiating power supply from the ground-side power supply device to a vehicle.

As illustrated in FIG. 5, when the charge initiation request transmitted from the vehicle V is received by the request reception part 42*a*, the power transmission control part 42*f* switches the state of the first power supply part 10 to the third power supply part 30 to the power reception mode (S101). This enables the first power supply part 10 to the third power supply part 30 to receive power transmitted from the vehicle-side power supply device 5. It should be noted that the request reception part 42*a* does not switch the power supply part from among the first power supply part 10 to the third power supply part 30 that is supplying power to another vehicle V into the power reception mode, but maintains the power transmission mode thereof. The power transmission request part 42*b* then transmits the power transmission request to the vehicle-side power supply device 5 of the vehicle V that has made the charge initiation request (S102). The vehicle-side power supply device 5 accordingly transmits power.

The power reception information acquisition part 42*c* acquires the first power reception information to the third power reception information after the power transmission request part 42*b* transmits the power transmission request (S103). The vehicle position determination part 42*d* determines whether the vehicle V is positioned at the first power supply position, whether the vehicle V is positioned at the second power supply position, and whether the vehicle V is positioned at the third power supply position based on the first power reception information to the third power reception information (S104).

The vehicle position determination part 42*d* determines whether the vehicle position determination part 42*d* has determined that the vehicle V is positioned at one of the first power supply position to the third power supply position (S105). When the power supply position at which the vehicle V is positioned is determined (S105: YES), the power transmission control part 42*f* switches the state of the power supply part from among the first power supply part 10 to the third power supply part 30 corresponding to the power supply position at which the vehicle V is positioned to the power transmission mode (S106).

The power transmission control part 42*f* also switches the state of the power supply part from among the first power supply part 10 to the third power supply part 30 other than the power supply part corresponding to the power supply position at which the vehicle V is positioned to the standby mode (S107). The power transmission control part 42*f* instructs the power supply part from among the first power supply part 10 to the third power supply part 30 switched to the power transmission mode to transmit power to initiate the transmission of power (S108).

However, when at S105, the power supply position at which the vehicle V is positioned cannot be determined (S105: NO), the notification instruction part 42*e* instructs the notification device 55 to provide notification to notify that there is a failure such as that the stop position of the vehicle V is misaligned from the first power supply position to the third power supply position (S109). The power transmission control part 42*f* then switches the state of the power supply part from among the first power supply part 10 to the third power supply part 30 switched to the power reception mode at S101 to the standby mode (S110).

Described next is the flow of a process for stopping the supply of power when the ground-side power supply device 1 is supplying power to the vehicle-side power supply device 5. It should be noted that the flow chart illustrated in FIG. 6 starts when the ground-side power supply device 1 receives the charge stop request from the vehicle V.

Figure 6:
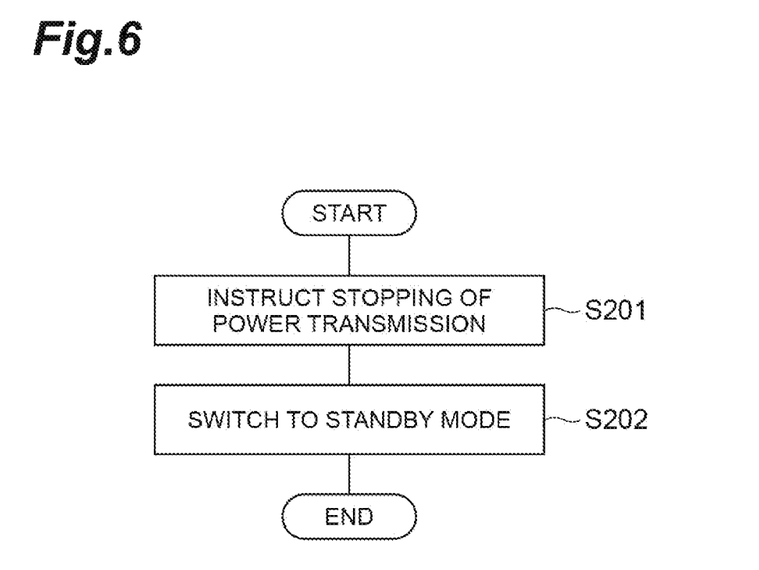
FIG. 6 is a flow chart illustrating the flow of a process of stopping the power supply from the ground-side power supply device to a vehicle.

As illustrated in FIG. 6, when the charge stop request transmitted from the vehicle V is received, the power transmission control part 42*f* instructs the power supply part from among the first power supply part 10 to the third power supply part 30 transmitting power to the vehicle V that has transmitted the charge stop request to stop transmitting power (S201). The power transmission control part 42*f* then switches the state of the power supply part from among the first power supply part 10 to the third power supply part 30 that has been instructed to stop transmitting power to the standby mode (S202).

As described above, in this ground-side power supply device 1, it is determined at which of the first power supply position to the third power supply position the vehicle V is positioned based on the first power reception information to the third power reception information acquired after the power transmission request is transmitted to the vehicle V. That is, the power transmitted from the vehicle V to determine the position of the vehicle V is received by one of the first coil part 11 to the third coil part 31, and can be used in the ground-side power supply device 1. The ground-side power supply device 1 is thus capable of determining the coil part (first coil part 11 to third coil part 31) for supplying power to the vehicle V and supplying power thereto while suppressing the waste of power in the case in which a plurality of the coil parts (first coil part 11 to third coil part 31) for supplying power to the vehicle V is installed.

It may be contemplated that power may be transmitted from the first coil part 11 to the third coil part 31 toward the vehicle V to determine at which of the first power supply position to the third power supply position the vehicle V is positioned. In a case in which this configuration is employed, if, for example, the vehicle V stops at a position slightly misaligned from the first power supply position, there may be a chassis of the vehicle V composed of a steel plate or the like in the position facing the first coil part 11 instead of the vehicle-side coil part 51. In this case, the magnetic flux from the first coil part 11 may pass through the chassis of the vehicle V, so that an eddy current is generated in the chassis, causing the chassis to be heated. It would thus be necessary to provide the vehicle V with a shield over a large area to deal with such positional misalignments of the stop position of the vehicle V. In contrast, in the power supply system 100 of the embodiment, power is transmitted from the vehicle V toward the road surface R (toward the first coil part 11, etc., installed in the road surface R) to determine at which of the first power supply position to the third power supply position the vehicle V is positioned. Since the power supply system 100 is not configured to transmit power to the vehicle V, there is no need to employ the configuration of providing the vehicle V with a shield over a large area to deal with positional misalignments of the stop position of the vehicle V. The power supply system 100 of the embodiment is thus capable of reducing the area in which to provide a shield compared to the case in which power is transmitted from the first coil part 11, etc., toward the vehicle V to identify the stop position of the vehicle V, thereby suppressing an increase in the weight of the vehicle V.

When the charge initiation request is received by the request reception part 42*a*, the power transmission request part 42*b* transmits the power transmission request to the vehicle V identified by the identification information included in the charge initiation request. This enables the ground-side power supply device 1 to initiate the transmission of the power transmission request and the determination of the power supply position at which the vehicle V is positioned at appropriate timings. Additionally, the ground-side power supply device 1 can appropriately transmit the power transmission request to the vehicle V that has made the charge initiation request by transmitting the power transmission request to the vehicle V identified by the identification information included in the charge initiation request.

In the ground-side power supply device 1, when power is received by a plurality of the coil parts from among the first coil part 11 to the third coil part 31 after the power transmission request is transmitted, the power transmission request is transmitted again to the vehicle V to transmit power in a predetermined power transmission pattern. By the vehicle V transmitting power again in the predetermined power transmission pattern, the power corresponding to the predetermined power transmission pattern is received by one of the first coil part 11 to the third coil part 31. The ground-side power supply device 1 is thus capable of determining at which of the first power supply position to the third power supply position the vehicle V to which the power transmission request has been made is positioned based on the first power reception information to the third power reception information acquired after the power transmission request is transmitted again and the predetermined power transmission pattern.

When the request reception part 42*a* receives the charge initiation requests from the first vehicle V1 and the second vehicle V2, the power transmission request part 42*b* transmits the power transmission request to the first vehicle V1 to transmit power in the first power transmission pattern, and transmits the power transmission request to the second vehicle V2 to transmit power in the second power transmission pattern. This enables the ground-side power supply device 1 to determine at which of the first power supply position to the third power supply position the first vehicle V1 and the second vehicle V2 are positioned based on the first power reception information to the third power reception information acquired, and the first power transmission pattern and the second power transmission pattern, for example, when initiating the power supply of the first vehicle V1 and the second vehicle V2 at the same time.

When the vehicle position determination part 42*d* determines that none of the first coil part to the third coil part has received power, the notification instruction part 42*e* causes the notification device 55 mounted in the vehicle V to provide notification that there is a failure. In this case, the notification instruction part 42*e* and the notification device 55 are capable, for example, of notifying the driver or the like of the vehicle V that there is a failure such as that the stop position of the vehicle V is misaligned from the first power supply position to the third power supply position.

Although the embodiments of the present disclosure have been described above, the present disclosure is not limited thereto. For example, when the vehicle V arrives at the power supply area in which the ground-side power supply device 1 is installed, all of the first power supply part 10 to the third power supply part 30 may be supplying power to other vehicles V (that is, there are no vacant power supply parts). The ground-side power supply device 1 may then, for example, determine whether there is a vacant power supply part when communication becomes possible between the communication part 41 and the vehicle-side communication part 53 of the vehicle V by the vehicle V approaching the power supply area. When there are no vacant power supply parts, the ground-side power supply device 1 may notify the vehicle V that there are no vacant power supply parts.

When power is received by the first coil part 11, etc., before the power transmission request is transmitted, the ground-side power supply device 1 may determine that there is a failure in the first power supply part 10, etc.

The power transmission control part 42f is not limited to stopping the transmission of power to the vehicle V when the charge stop request is received from the vehicle V. For example, the power transmission control part 42f may stop transmitting power to the vehicle V when the power transmission time to the vehicle V exceeds a predetermined time.

Although the ground-side power supply device 1 has three power supply parts being the first power supply part 10 to the third power supply part 30, the number of the power supply parts is not limited to three. It is only required that the ground-side power supply device 1 has two or more power supply parts.

The first sensor part 12b provided in the first power supply part 10 is not limited to being provided in the first control part 12. For example, there may be a wire extending from the first power supply part 10 to the integrated control part 40, and the power state of when the first coil part 11 receives power may be detected in the integrated control part 40. Similarly, the second sensor part 22b and the third sensor part 32b are not limited to being provided in the second control part 22 and the third control part 32, respectively.

The ground-side power supply device 1 is not limited to supplying power to the vehicle V as the movable object. The ground-side power supply device 1 may determine the stop position (power supply part for supplying power) of a movable object other than the vehicle V (for example, drones or underwater sailing bodies) by the above method and supply power thereto. Additionally, the ground-side power supply device 1 as the power supply device is not limited to being installed in the ground. The power supply device may be installed in suitable positions, such us under water, according to the type of the movable object to which power is to be supplied.

INDUSTRIAL APPLICABILITY

The power supply device and the power supply system of the present disclosure are capable of supplying electric power by determining the coil part for supplying power to the movable object while suppressing the waste of power in the case in which a plurality of the coil parts for supplying power to the movable object is installed.

REFERENCE SIGNS LIST

1 Ground-side power supply device (power supply device)
5 Vehicle-side power supply device (movable object-side power supply device)
11 First coil part
21 Second coil part
42a Request reception part
42b Power transmission request part
42c Power reception information acquisition part
42d Vehicle position determination part (movable object position determination part)
42e Notification instruction part (Notification part)
42f Power transmission control part
55 Notification device (notification part)
100 Power supply system
V Vehicle (movable object)
V1 First vehicle (movable object, first movable object)
V2 Second vehicle (movable object, second movable object)

The invention claimed is:

1. A power supply device comprising:
a first coil part and a second coil part capable of wirelessly transmitting and receiving power to and from a movable object;
a power transmission request part configured to transmit a power transmission request to the movable object, wherein at least one of the first coil part or the second coil part receive power transmitted by the moveable object in response to the moveable object receiving the power transmission request;
a power reception information acquisition part configured to acquire, from at least one of the first coil part or the second coil part, at least one of first power reception information indicating a power reception state of the first coil part or second power reception information indicating a power reception state of the second coil part after the power transmitted by the moveable object is received;
a movable object position determination part configured to determine whether the movable object is positioned at, at least one of a first power supply position for transmitting and receiving power to and from the first coil part, or a second power supply position for transmitting and receiving power to and from the second coil part based on at least one of the first power reception information and the second power reception information; and
a power transmission control part configured to cause the first coil part to transmit power when the movable object position determination part determines that the movable object is positioned at the first power supply position, and cause the second coil part to transmit power when the movable object position determination part determines that the movable object is positioned at the second power supply position.

2. The power supply device according to claim 1, further comprising a request reception part configured to receive a charge initiation request including identification information of the movable object from the movable object,
wherein after the request reception part receives the charge initiation request the power transmission request part transmits the power transmission request to the movable object identified by the identification information.

3. The power supply device according to claim 2, wherein the power transmission request part is further configured to transmit the power transmission request to the movable object to transmit power in a predetermined power transmission pattern when the movable object position determination part determines that the power transmitted by the moveable object is received by both the first coil part and the second coil part based on the first power reception information and the second power reception information, the power reception information acquisition part is further configured to acquire the predetermined power transmission pattern from the moveable object, via the first coil part or the second coil part, and the movable object position determination part is further configured to determine at which of the first power supply position or the second power supply position the movable object is positioned based on which of the first power reception information or the second power reception information includes the predetermined power transmission pattern from the moveable object.

4. The power supply device according to claim 2, wherein the movable object includes a first movable object and a second movable object, after the request reception part receives the charge initiation request from the first movable object and the second movable object, the power transmission request part is further configured to:

transmit a first power transmission request to the first movable object, the first power transmission request requesting the first movable object to transmit the power in a predetermined first power transmission pattern, and transmit a second power transmission request to the second movable object, the second power transmission request requesting the second movable object to transmit the power in a predetermined second power transmission pattern different from the predetermined first power transmission pattern, the power reception information acquisition part is further configured to acquire the predetermined first power transmission pattern from the first moveable object and the predetermined second power transmission pattern from the second moveable object, and the movable object position determination part is further configured to determine at which of the first power supply position and the second power supply position the first movable object is positioned, and to determine at which of the first power supply position and the second power supply position the second movable object is positioned based on the predetermined first power transmission pattern and the predetermined second power transmission pattern.

5. The power supply device according to claim 1, further comprising a notification part configured to provide notification when the movable object position determination part determines that neither the first coil part nor the second coil part has received the power based on the first power reception information and the second power reception information.

6. A power supply system comprising:
the power supply device according to claim 1; and
a movable object-side power supply device mounted in the movable object and capable of wirelessly transmitting the power and receiving power to and from the first coil part and the second coil part, and
wherein the movable object-side power supply device is configured to transmit the power according to the power transmission request transmitted by the power transmission request part.

* * * * *